July 21, 1925.
H. J. HEIDER
POWER CULTIVATOR
Filed April 13, 1922
1,546,446
2 Sheets-Sheet 1
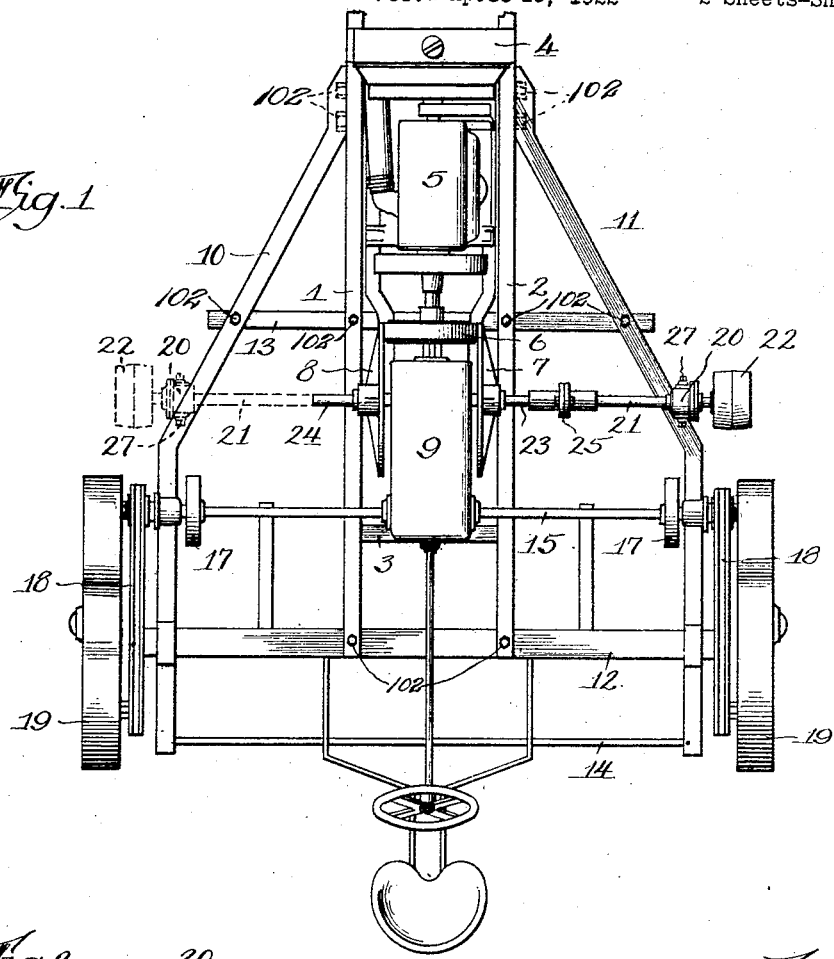
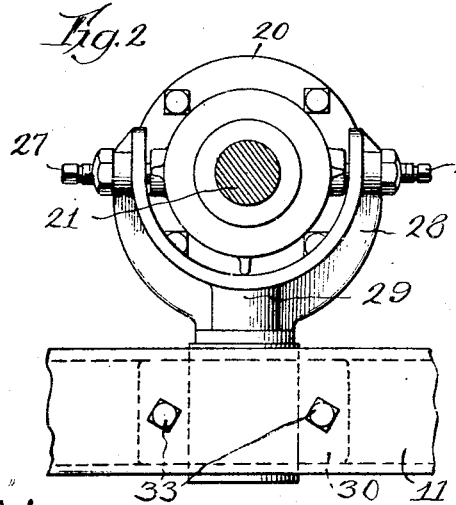
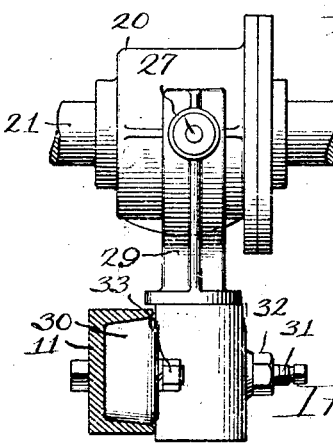
Inventor
Henry J. Heider,
By Chas. E. Bulkley, Attys.
Witness: Chas. R. Kowish

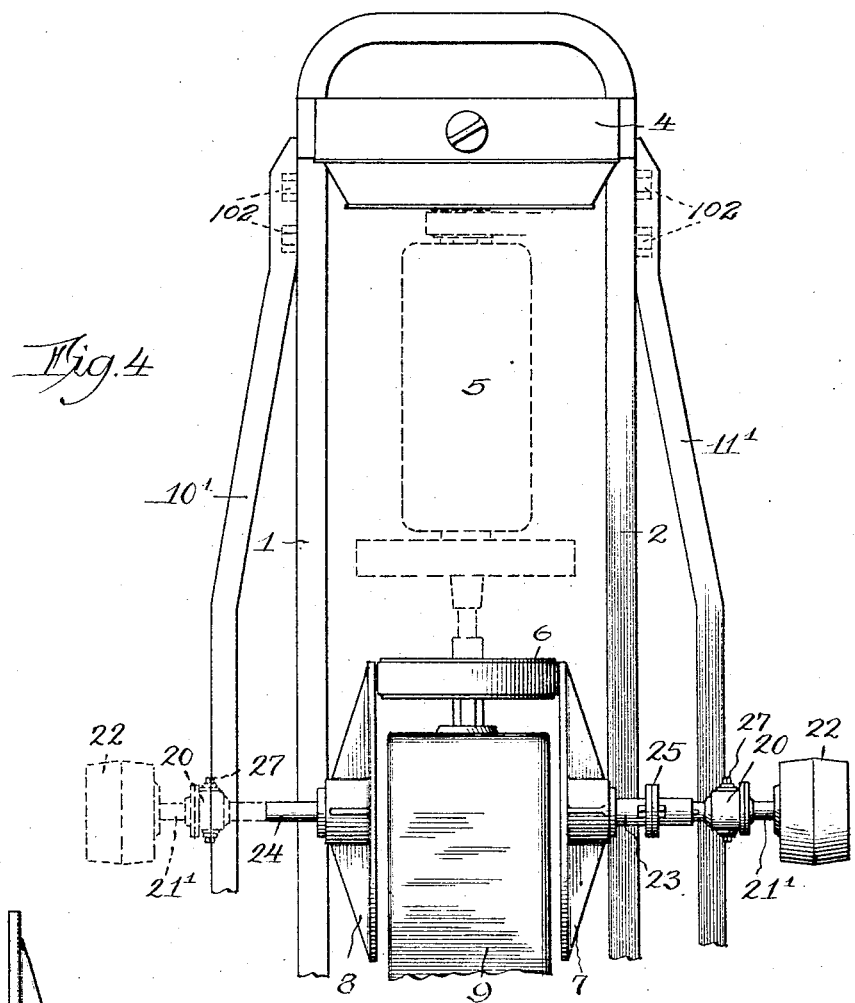
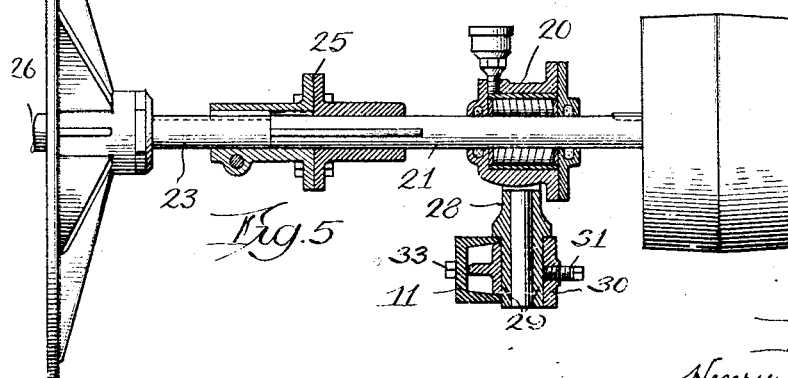

Patented July 21, 1925.

1,546,446

UNITED STATES PATENT OFFICE.

HENRY J. HEIDER, OF CARROLL, IOWA, ASSIGNOR TO ROCK ISLAND PLOW COMPANY, OF ROCK ISLAND, ILLINOIS, A CORPORATION OF ILLINOIS.

POWER CULTIVATOR.

Application filed April 13, 1922. Serial No. 552,428.

*To all whom it may concern:*

Be it known that I, HENRY J. HEIDER, a citizen of the United States of America, and resident of Carroll, Carroll County, Iowa, have invented a certain new and useful Improvement in Power Cultivators, of which the following is a specification.

The objects of my invention are to provide a power cultivator of such construction that the power plant, including all of the most intricate part of the mechanism may be permanently assembled as a complete self-contained unit convenient for shipping and adapted without change or alteration to be assembled with co-operating parts to form a cultivator of any desired width, and to effect this purpose without the necessity of providing special parts of bearings for the power take-off shaft and at the same time to make it possible to mount the power take-off shaft and its pulley on either side of the machine.

In the drawings—

Figure 1 is a plan view showing the principal parts of the cultivator, but for simplicity omitting details not necessary to the explanation of the invention claimed herein;

Figures 2 and 3 are front and side views of a bearing for the power take-off shaft;

Figure 4 is a plan view of the front part of a cultivator showing a central frame and power plant like that shown in Fig. 1, but with the side frame less divergent at front and closer to the central frame;

Figure 5 is a detailed view, partly in section, of one of the friction discs, and the power take-off shaft and pulley.

The central frame structure comprises the side members 1, 2, and cross members, one of which is shown at 3. This central frame structure is permanently assembled as a separate unit together with the motor 5, radiator 4, friction fly-wheel 6, friction discs 7 and 8, gear case 9 containing the differential and the gearing connecting it to the friction disc shaft. The side frame members 10, 11, and the long cross members 12, 13 and 14 are provided with means, bolts 102—102 preferably, for detachably connecting them to each other and to the central frame. The central frame and power plant are permanently assembled at the place of manufacture and form an independent unit for shipment and for keeping in stock, leaving only the simpler parts, such as the jack shaft 15, brake mechanism 17, sprocket drive 18, wheels 19, the operating connections extending to the driver's seat, etc., to be assembled when the machine is to be put into use.

The motor, friction drive and differential are preferably of the type shown in my co-pending application Serial Number 552,427, filed April 13, 1922.

For the purpose of utilizing the engine as a source of power for miscellaneous purposes, I provide a power take-off shaft 21 adapted to be connected by a coupling 25 with either the projecting end 23 or 24 of the friction disc shaft 26. I support the outer end of the shaft 21 in a bearing designated by the numeral 20. Comparison of Figure 1 with Figure 4 shows that the power take-off shafts upon the narrower and wider machines are in different angular relation to the side frame members. In order to adhere to a single standard of construction for all of the working parts of the mechanism in machines of different width and to make it possible to take the power off at either side of the machine without providing additional mechanism, I pivot the journal 20 upon horizontal trunnions 27 carried by a yoke 28 which has a downwardly extending cylindrical support 29 which is rotatably adjustable in a vertical bearing in bracket 30 which is bolted to side frame member 11. A set screw 31 and lock nut 32 afford means for holding the yoke in adjusted position.

It will be apparent that the construction above described affords means whereby the assembled center frame and power plant is adaptable as a unit for use with side frames of the forms shown in Figs. 1 and 4, or with side frames of any other desired width; that the use of the central power unit as a part of cultivators of different width as shown in Figs. 1 and 4, or in cultivators of other desired width does not necessitate the provision or carrying in stock of extra parts other than side frame and cross members of the requisite form and size, and that the power take-off shaft may be mounted on either side of the machine. The proper positioning of the bracket 30 longitudinally of the side frame members is provided for by properly positioning bolt holes in the side frame members for the bolts 33 which hold the brackets in place. The yoke 28 may be properly aligned by means of rotary adjustment in its vertical supporting stem 29 and the bearing 20 by oscillation on horizontal trunnions 27.

What I claim as my invention is:

1. A power cultivator comprising a permanently assembled frame structure and power plant including longitudinal side frame members rigid with said structure, a power shaft extending from said power plant transversely beyond one of said longitudinal side frame members; means permitting detachable connection of a plurality of auxiliary side frame members at varying angles with and distances from said longitudinal side frame members to vary the width and shape of the entire structure, and a journal bearing adjustable in vertical plane and having detachable connection with any of said auxiliary side frame members whereby said bearing may be arranged in supporting alignment with said power shaft in any position of said auxiliary side frame members.

2. A power cultivator comprising a permanently assembled frame structure and power plant including longitudinal side frame members rigid with said structure, a power shaft extending from said power plant transversely beyond one of said longitudinal side frame members; means permitting detachable connection of a plurality of auxiliary side frame members at varying angles with and distances from said longitudinal side frame members to vary the width and shape of the entire structure, and a journal bearing adjustable in both horizontal and vertical plane and having detachable connection with any of said auxiliary side frame members whereby said bearing may be arranged in supporting alignment with said power shaft in any position of said auxiliary side frame members.

Signed by me at Rock Island, Ill., this 22 day of March, 1922.

HENRY J. HEIDER.